July 9, 1935.  C. G. JONES  2,007,167
INDUCTOR FOR INDUCTION WELDING MACHINE
Filed April 29, 1933  4 Sheets-Sheet 2
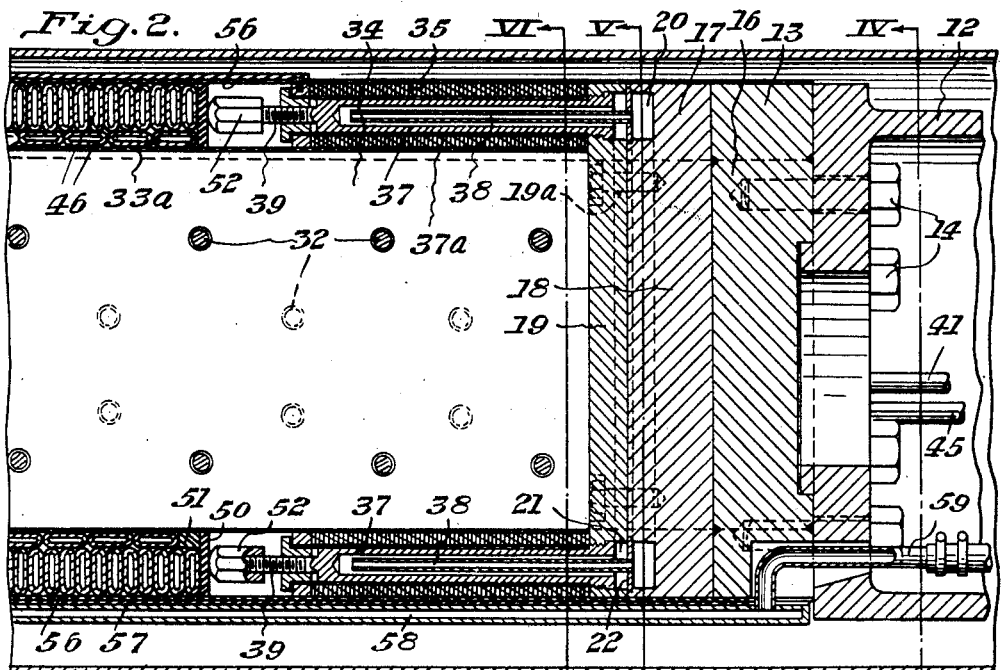
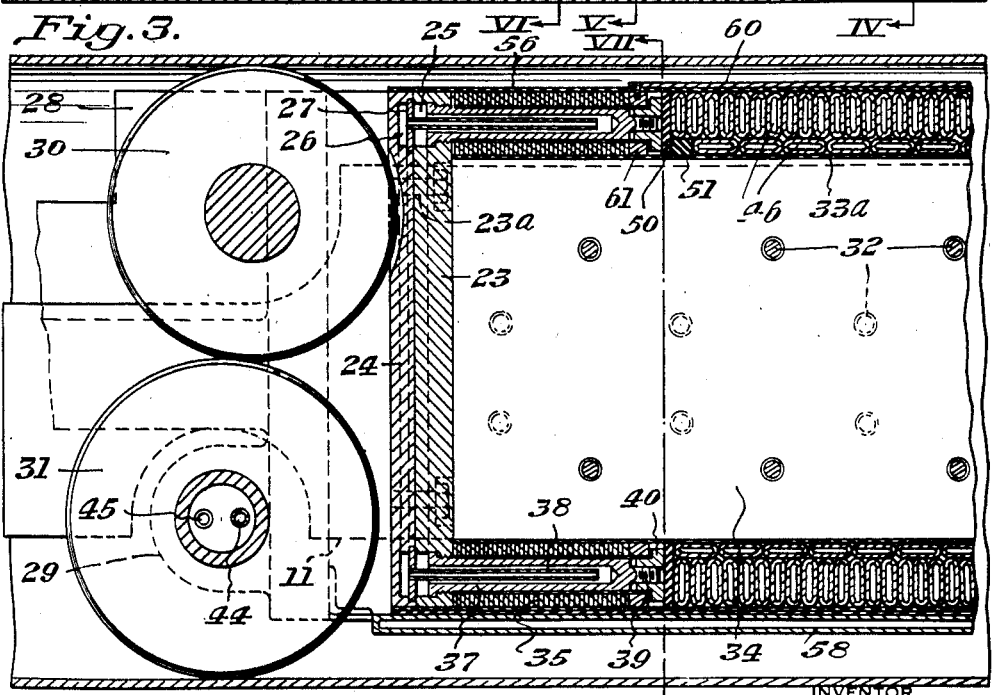
INVENTOR
Carl G. Jones
by his attorneys
Byrnes, Stebbins, Parmelee & Blenko July 9, 1935. C. G. JONES 2,007,167
INDUCTOR FOR INDUCTION WELDING MACHINE
Filed April 29, 1933  4 Sheets-Sheet 3

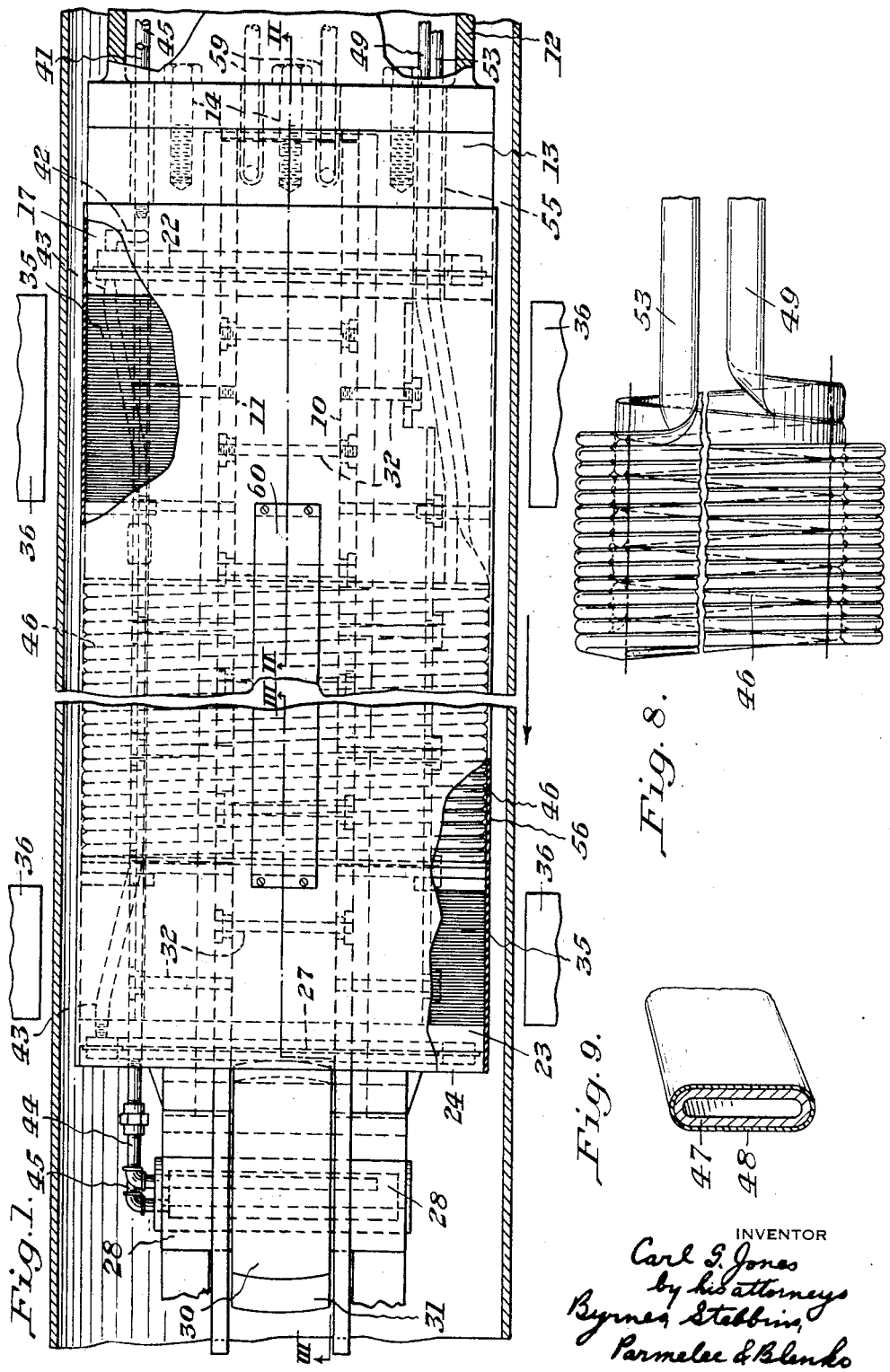

INVENTOR
Carl G. Jones
by his attorneys
Byrnes, Stebbins,
Parmelee & Blenko

July 9, 1935.  C. G. JONES  2,007,167
INDUCTOR FOR INDUCTION WELDING MACHINE
Filed April 29, 1933   4 Sheets-Sheet 4
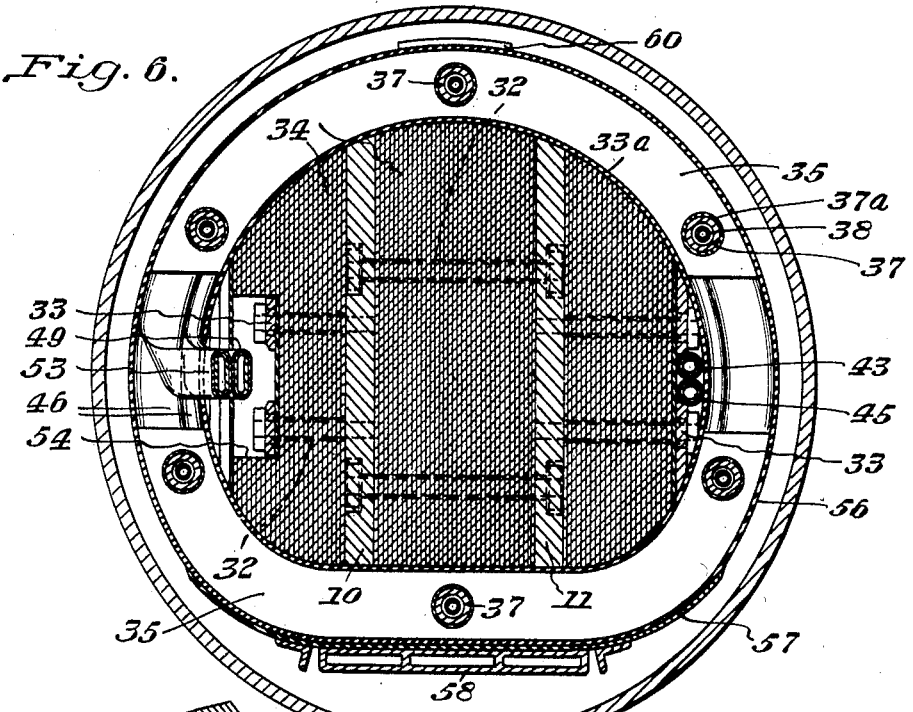
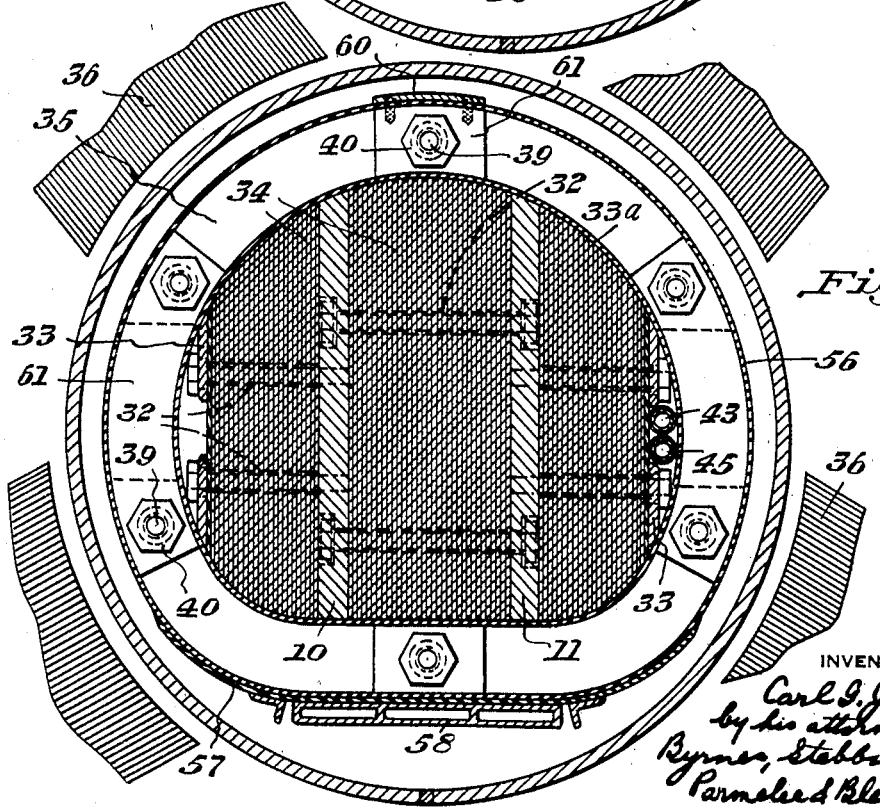

Patented July 9, 1935

2,007,167

UNITED STATES PATENT OFFICE 2,007,167

INDUCTOR FOR INDUCTION WELDING MACHINE

Carl G. Jones, Youngstown, Ohio, assignor to The Youngstown Sheet & Tube Company, Youngstown, Ohio, a corporation of Ohio Application April 29, 1933, Serial No. 668,603

14 Claims. (Cl. 219—6)

My invention relates to the art of electric welding and, in particular, to induction welding and to an inductor or means for inducing in a formed tube blank a circumferential welding current.

The welding of tube blanks by the induction method is now well known, having been practiced successfully for a considerable length of time. Certain difficulties have been encountered, however, in the apparatus heretofore used in practicing this method. One of the chief difficulties has been the provision of a satisfactory inductor for inducing the welding current in the tube blank. It is obvious that the inductor is subjected to extreme conditions and to very severe usage since it must fit closely within the tube blank and is immediately adjacent the zone in which the seam in the tube blank is progressively heated and welded.

I have invented an inductor for induction welding machines which is capable of withstanding the extreme conditions to which it is subject in service and which is capable of operating continuously throughout long periods without extensive maintenance. The invention is characterized by a laminated core surrounded by an inducing coil wound of a hollow, insulated tube. At the ends of the core, laminated pole pieces are provided for cooperation with the terminals of yokes forming a return path for the magnetic flux external to the tube being welded. The outer ends of the pole pieces are provided with shunts or shields for a purpose to be specified hereinafter. Since these shunts are subject to the temperature of the heating and welding zone, I provide means for water-cooling them. I also provide water-cooling means for the pole pieces. The tubular coil conductor is also cooled by circulating water. Numerous other advantageous features of construction will become apparent as the description of the invention proceeds.

For a complete understanding of the invention, reference is made to the accompanying drawings illustrating a present preferred embodiment, although it is to be understood that numerous changes in the construction described and shown may be made within the scope of my broader claims. In the drawings:—

Figure 1 is a plane view of the inductor showing parts broken away, and the tube being welded in section;

Fig. 2 is a partial vertical section of the invention taken substantially along the line II—II of Figure 1;

Figure 3 is a similar sectional view along the line III—III of Figure 1 showing parts in elevation;

Figure 6 is a sectional view along the line VI—VI of Figure 2;

Figure 7 is a sectional view along the line VII—VII of Figure 3;

Figure 8 is a partial side elevation of the coil comprising a tubular conductor wound on the magnetic core; and Figure 9 is a perspective view of a portion of the conductor showing also the section thereof.

Figure 4:
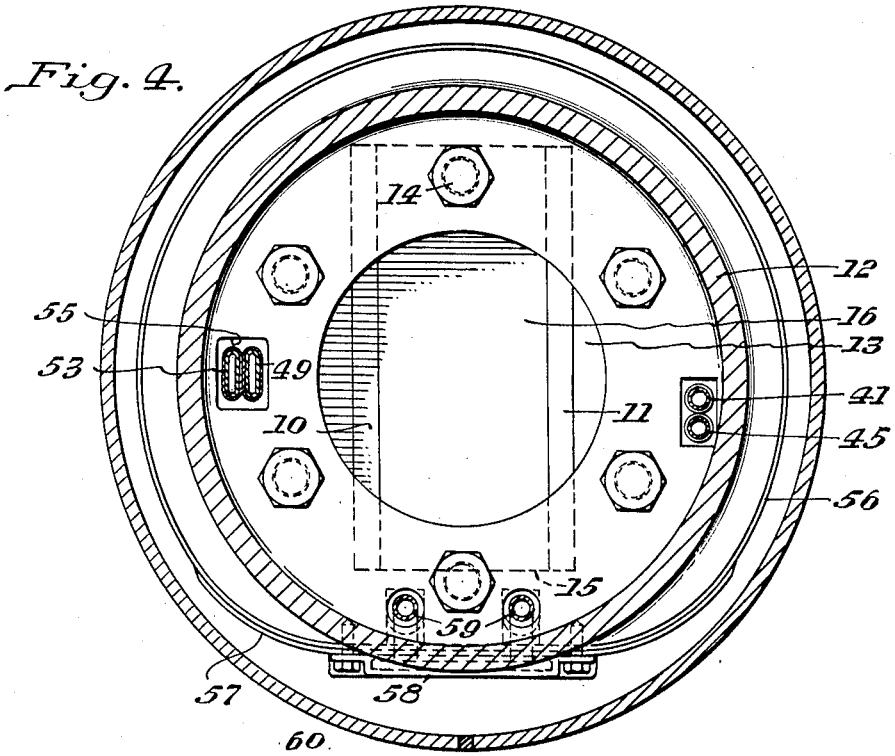
Figure 4 is a sectional view along the line IV—IV of Figure 2.

Referring now in detail to the drawings, the core of the inductor of my invention is assembled upon a longitudinal frame comprising plates 10 and 11 extending substantially the full, effective length of the inductor. A supporting head 12 of generally tubular shape is supported against longitudinal movement by means extending along the tube, through the open seam thereof and to some fixed portion of the apparatus for moving the tube or other convenient support. An end plate 13 is secured to the head 12 by screws 14. The end plate 13 is provided with a rectangular opening 15 into which the ends of the plates 10 and 11 are welded in abutting relation with one face of the supporting head 12. A spacing block 16 is welded in the opening 15 between the plates 10 and 11.

A shunt or shield 17 at the right hand end of the core as shown in Figures 1 and 2, is composed of discs 18 and 19 which are slotted for the passage of the plates 10 and 11. The disc 19 is secured to the disc 18 by screws 19a. Opposed faces of the discs 18 and 19 are provided with annular channels 20 and 21. The edges of the channel 20 are recessed to provide a seat for a dividing ring 22.

At the left-hand end of the inductor as viewed in Figures 1 and 3, discs 23 and 24 similar to the discs 18 and 19 are secured together by screws 23a. Both the discs are slotted to receive the plates 10 and 11. Annular passages 25 and 26 are formed in the opposed faces of the plates and a separating ring 27 is seated in recesses at the edges of the passage 26.

Figure 5:
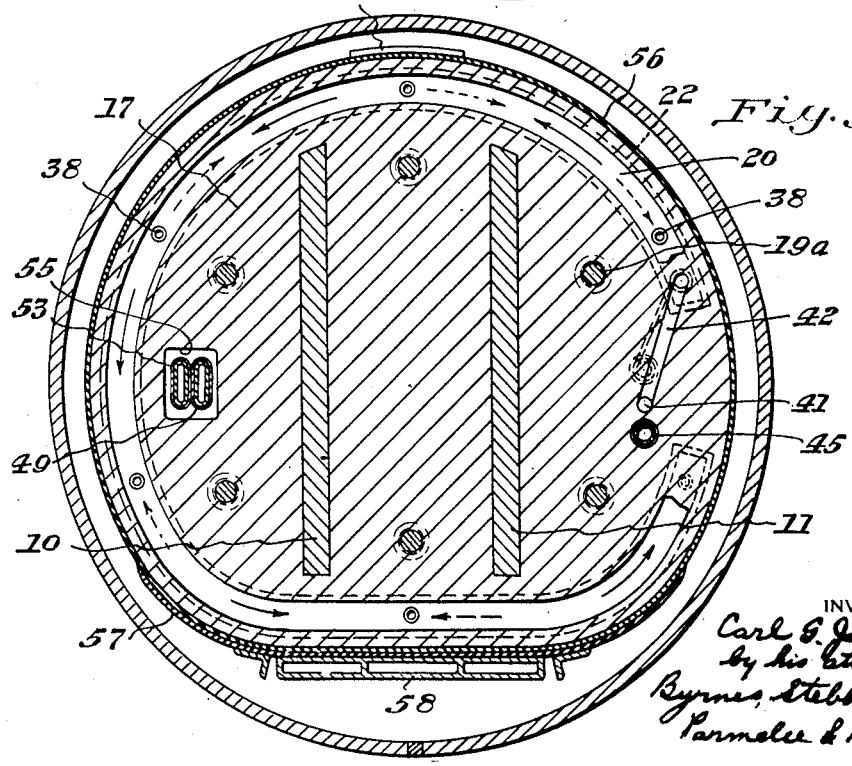
Figure 5 is a sectional view along the line V—V of Figure 2.

Bearings 28 and 29 are secured to the left-hand end of the inductor as shown in Figure 3. Rolls 30 and 31 are journaled on shafts supported in the bearings, for engaging the tube blank at points adjacent and diametrically opposite the seam. As shown in Figures 4 through 7, the tube blank is positioned so that the seam is disposed at the bottom thereof.

The core proper is composed of laminations assembled between and external to the frame plates 10 and 11. The laminations are secured together by clamping studs 32 and clamping plates 33. The arrangement of the core laminations is clearly shown in Figures 6 and 7. An insulating sheath 33a surrounds the core.

Adjacent the ends of the core laminations, which are indicated generally at 34, pole pieces or internal yokes 35 are built up for cooperation with yoke terminals 36 forming part of the external return magnetic circuit. The pole pieces 35 are built up of segmental laminations which are assembled around the ends of the core laminations 34 on studs 37 projecting through the channels in the discs 19 and 23 and having threaded engagement therewith, as shown in Figures 2, 3 and 6. Insulating sleeves 37a surround the studs 37. The studs 37 are bored to facilitate cooling. Tubes 38 extend through the separating rings 22 and 27 into the bore of the studs 37. The studs 37 have reduced threaded ends 39 and nuts 40 thereon for clamping the laminations forming the pole pieces 35 and to form an abutment for the inductor winding which will be described in detail hereinafter.

The function of the shunts 18, 19, 23 and 24 is to force the flux traversing the core to bridge the gap between the pole pieces and the external yoke terminals within which the work circuit constituted by the tube blank is disposed. Any stray flux tending to leave the core axially must traverse one of the shunts. Any variation in the flux traversing the shunts, of course, develops internal electromotive forces which give rise to circulating currents. These, in turn, produce a flux in opposition to the inducing flux, in accordance with Lenz's law, and effectively oppose any tendency on the part of the flux lines to deviate from the metallic path including the core, pole pieces, yoke terminals and yokes.

Since the shields and pole pieces are subject to extreme temperatures, they must be artificially cooled. I provide an inlet conduit 41 extending through the head 12, the plate 13 and into the disc 17. A passage 42 in the latter connects the conduit 41 to the channel 20 in the disc 17. Cooling water supplied to the conduit 41 flows through the passage 42 into and around the annular channel 20 in the disc 17 in the direction shown by the solid arrows in Figure 5. From the channel 20, the water flows through the tubes 38 which project from the separator 22 into the bores in the studs 37 on which the pole piece 35 is assembled. The water thus passes down through the studs and back into the channel 21 in the disc 19, in the direction of the dotted arrows. From the latter, a conduit 43 extends the length of the core as shown in Figures 6 and 7. The conduit 43 discharges cooling water into the channel 25 in the disc 23. From the channel 25, the water flows through the studs 37 at the left-hand end of the core and back through the tubes 38, into the channel 26 in the disc 24. From the channel 26, the conduit 44 extends into the hollow shaft on which the bottom roll 31 at the left-hand end of the coil is mounted. After flowing through the shaft, the water is returned through a conduit 45 to the right hand end of the core and discharged.

The inductor coil is indicated generally at 46 and is composed of a hollow conducting tube 47 having an insulating sheath 48 therearound. The beginning end of the coil is shown at 49 and the tube is wound flatwise around the core for the first layer, as shown in Figures 2, 3 and 8. Insulating spacers 50 and 51 supported by heads 52 threaded on the ends 39 of the studs 37, provide a continuous abutment for the end of the winding. When the first layer of flatwise turns has been completed, the tubular conductor is disposed edgewise and a second layer is wound back along the length of the inductor as shown in Figures 2, 3 and 8, the finishing end of the winding being shown at 53. The right-hand end of the core is slotted at one side indicated at 54 to permit the coil ends 49 and 53 to pass out through a passage 55 extending through the discs 19 and 18, the plate 13 and the head 12. Since the coil conductor is hollow, it may readily be cooled by the circulation of water therethrough.

When the coil has been wound, the core assembly is provided with an external heat insulating layer 56. An additional protective layer 57 is applied to the bottom of the assembly to guard it against the excessive temperatures developed along the line of the seam. Further protection is provided by a water jacket 58 secured to the bottom of the core assembly and provided with water-cooling connections 59. The water jacket 58 has a plurality of longitudinal passages therein, designed to afford a continuous path for cooling water. A guard plate 60, preferably of manganese steel, is secured to the top of the assembly to protect it against mechanical abrasion.

The coil and core assembly may be effected by building up the core laminations first between the plates 10 and 11. Additional laminations are then attached to the exposed sides of these plates and secured by clamps 33. The complete core is then turned down to the proper dimensions as shown in Figure 7.

The shunts or shields are assembled with the studs 37 projecting therefrom and are then fitted over the ends of the core. The segmental laminations constituting the yokes or pole pieces are then assembled on the studs 37. The segments 61 are then applied and the nuts 40 tightened. The core, shunts and pole pieces or yokes provide a spool-like structure upon which the coil can be wound. The pole pieces form abutments at the ends of the cylinder provided by the core. After the coil has been wound on the core, the whole assembly is immersed in a high melting point insulating impregnating agent so that when cooled, the unit is tight and rigid.

There are four air-gaps in the magnetic circuit of the welder. The largest gap exists between the outer yokes 36 and the internal yokes 35. The flux density in the internal yokes 35 is very high, and due to the large air-gap, the reluctance of the flux path is high. An air-gap also exists between the internal yokes 35 and the main core 34. This combination of high flux density having to pass through air-gaps in series means that the flux will seek out the paths of low reluctance, the result being that a considerable amount of flux would ordinarily pass out into the adjacent structures of the inductor such as plates 10, 11, the cast head supporting rolls 30, 31 and support piece 12. This stray flux would cause excessive heating and warping of these parts.

By placing a low resistance metal shield across or covering this stray field, such as shown at 17, the stray field induces a voltage in the low resistance metal, thereby causing a current to flow. The amount of stray field represents so many ampere-turns; also the amount of stray field represents so many volts induced in the magnetic shunt. For a given induced voltage, the lower the resistance of the shunt, the more current will flow, that is, more opposing ampere-turns shunting or bucking the stray flux. The amperes flowing have their own IR drop, which drop will be low if the resistance of the shunt is low, and this IR drop represents the amount of stray flux, which finally gets through the shunt. If the shunt had zero resistance, no stray flux would get through. It becomes obvious, therefore, that the greater the section of the shunt, the lower its resistance and the lower the amount of stray flux which actually gets through the shunt.

The core is so machined after assembly that the coil is wound directly on the core, which acts as a mandrel. In so doing I eliminate the need for expensive mandrels, also clearance between core and coil for assembly purposes, and an auxiliary cooling system for the core. When coils are wound on a separate mandrel, the manufacturing tolerances for later assembly is so great as to introduce a heat insulating path between the water in the coil and the edges of the laminations.

Heretofore, it has been necessary to use an auxiliary or separate water cooling system for the main core. A separate mandrel was made for each core, because the coil musts be treated in an insulating gum at high temperature before the mandrel could be removed and this operation destroyed the mandrel for future use.

Since I machine the finished core and wind directly on it, the edge of each lamination is placed in close relation to the cooling water of the coil, it being known that heat is conducted from a lamination edge eight times as fast as across laminations. This form of core cooling is much more efficient with the first layer being made of a wide flat conductor of few turns than an edgewise conductor of many turns, because of the space factor of the winding. An edgewise conductor presents a curved surface to a flat surface; therefore, its efficiency as a heat conductor is many times less than a flat wound conductor. The inside conductor need not be of the same section as the outer layer conductor, because of its double function of core cooling and conductor cooling. Where the outer layers are subjected to external heat, it is advantageous to edge wind because of the low thermal efficiency of such a winding.

It will be apparent from the foregoing description that the inductor of my invention is characterized by numerous advantages. In the first place, the inductor structure is mechanically strong and rigid. These characteristics are assured by assembling the parts upon a rigid metallic frame. The inductor, furthermore, is protected against the extreme conditions under which it must necessarily operate. Artificial cooling protects the metallic parts including the shunts or shields, the pole pieces and the coil itself. Special cooling means is also provided for the bottom of the inductor which is closest to the seam being welded. The inductor can be readily assembled from simple parts. The manner of winding the coil contributes further advantages in that, in the first row of coil turns, the conductor is disposed flatwise to the core and therefore presents a greater contact surface for the transmission of heat from the core. By winding the second layer edgewise, the electrical advantages of a second layer, edgewise-wound coil are obtained, with the additional advantage that the finishing end of the coil does not have to be brought back along the coil. In other words, the starting and finishing ends of the coil come out naturally at the same end of the inductor for easy connection to the source of current.

Although I have described herein but a single preferred embodiment of the invention, it will be apparent that many changes in the device as disclosed may be made without departing from the spirit of the invention or the scope of the appended claims.

I claim:

1. In an induction welding machine for welding a seam in a formed tube blank, an inductor comprising a rigid frame including side walls and disc shields secured adjacent the ends of said walls, and a laminated core assembled about the frame.

2. In an induction welder for welding a seam in a formed tube blank, flux-inducing means comprising a laminated, cylindrical core assembled about a rigid frame, magnetic means attached adjacent the ends of said frame co-axially thereof for opposing the tendency of the flux through the core to stray from a predetermined path including said core as part thereof, cooling passages formed in said magnetic means, and means for supplying cooling fluid thereto.

3. Flux-inducing means for induction tube welders comprising a laminated cylindrical core assembled about a rigid frame, magnetic discs attached to said frame coaxially thereof, adjacent its ends, said discs having cooling passages therein, annular magnetic members surrounding said core adjacent said discs and forming pole pieces for the core, passages in said pole pieces for cooling fluid, and means for supplying fluid to said cooling passages.

4. An inductor for induction tube welders comprising a rigid frame including shielding discs adjacent the ends thereof having cooling channels, a laminated core assembled about said frame, pole pieces adjacent the ends of the core composed of segmental laminations assembled on studs extending from said shields, cooling passages in said studs, and means for supplying cooling fluid to said channels and passages.

5. An inductor for induction tube welders comprising a frame including shielding discs, a core assembled on said frame between said discs, pole pieces for the core adjacent said discs, means for cooling the discs and the pole pieces, and a winding on said core between said pole pieces.

6. An inductor for induction tube welders comprising a frame, a core assembled thereon, and a flat conductor wound upon said core in a plurality of layers, the conductor being disposed flatwise on the core in the initial layer.

7. An inductor for induction tube welders comprising a frame, a laminated core assembled thereon, pole pieces adjacent the ends of the core, and an inducing winding on the core consisting of a flat conductor wound thereon in a plurality of layers, the initial layer being disposed flatwise to the core, and a subsequent layer being disposed edgewise.

8. An inductor for induction tube welders comprising a core, shielding means adjacent the ends of the core, pole pieces on the core adjacent said shielding means, an inducing winding on the core between said pole pieces, and spacing means between the pole pieces and the ends of the inducing winding.

9. An inductor for induction welding machines comprising a core, shielding discs adjacent the ends of the core, pole pieces for the core adjacent the discs, annular channels in said discs, axial passages in said pole pieces communicating with said channels, and means for supplying cooling fluid to said channels and passages.

10. An inductor for induction welding machines comprising a core, pole pieces for the core adjacent the ends thereof, shields at the ends of the core, said shields and pole pieces having passages therein for cooling fluid, a coil surrounding said core consisting of a tubular conductor, a cooling jacket for protecting the inductor from welding heat, and means for supplying cooling fluid to said shields, said pole pieces, said conductor and said jacket.

11. In an inductor for induction tube welders, a core, shielding discs adjacent the ends thereof, annular channels in said discs, and annular separators in said channels for guiding cooling fluid therethrough.

12. In an inductor for induction tube welders, a core, a winding thereon, and a shield at one end of the core comprising a pair of juxtaposed plates having annular channels in their engaging faces, a separating ring between said channels, and means for supplying cooling fluid to the channels.

13. An inductor for induction tube welders comprising a core, shielding discs at the ends of the core, studs projecting axially of the core from the shields and having cooling means extending thereinto, and pole pieces for the core assembled on said studs.

14. In an inductor for an induction tube welder, the combination with a core, of a coil surrounding the core, said coil being composed of a flat conductor wound in two layers, the conductor being disposed flatwise to the core in the initial layer and edgewise to the core in the succeeding layer.

CARL G. JONES.